United States Patent [19]

Mueller

[11] Patent Number: 4,657,773
[45] Date of Patent: Apr. 14, 1987

[54] PROCESS AND AN APPARATUS FOR DRESSING SEED

[75] Inventor: Roman Mueller, Niederuzwil, Switzerland

[73] Assignee: Gebruder Buhler AG, Switzerland

[21] Appl. No.: 793,063

[22] PCT Filed: Mar. 14, 1985

[86] PCT No.: PCT/EP85/00103
§ 371 Date: Oct. 21, 1985
§ 102(e) Date: Oct. 21, 1985

[87] PCT Pub. No.: WO85/04072
PCT Pub. Date: Sep. 26, 1985

[30] Foreign Application Priority Data

Mar. 15, 1984 [CH] Switzerland ............... 1300/84
Mar. 31, 1984 [DE] Fed. Rep. of Germany ....... 3412037

[51] Int. Cl.$^4$ ............. A01C 1/06; A01G 5/06; B05B 17/00; B05C 5/00
[52] U.S. Cl. ............................. 427/4; 47/57.6; 118/303; 427/212; 427/425
[58] Field of Search ........... 118/303; 427/4, 212, 427/425; 47/57.6

[56] References Cited

U.S. PATENT DOCUMENTS 4,320,715  3/1982  Maloney et al. ........... 118/303
4,360,545  11/1982  Maloney et al. ........... 427/212

FOREIGN PATENT DOCUMENTS

293777  10/1971  Austria .
531382  1/1930  Fed. Rep. of Germany .
3244059  6/1984  Fed. Rep. of Germany .
157922  4/1970  Hungary .
1417694  12/1975  United Kingdom .
2043489  10/1980  United Kingdom .
2078550  1/1982  United Kingdom .
826985  5/1981  U.S.S.R. .

Primary Examiner—Michael R. Lusignan
Attorney, Agent, or Firm—Darby & Darby

[57] ABSTRACT

For dressing, seed is thrown off in dispensed doses into a trough-shaped rotary table (36) in the form of a free-falling annular veil. During its freefall, the seed is guided through a jet of dressing in the form of an annular surface, which is thrown outwards from the interior of the annular veil and which is generated when dressing is thrown out via a centrifugal plate (36), and is wetted with dressing. During the subsequent throwing out on the rotary table (9), the seed is subjected again to dressing which is finely distributed on and massaged into the grain surface because the seed grains roll on the rotary table (9) continuously and at the same time strike against one another and rub on one another. In an apparatus for carrying out the process, the rotary table (9) is made dish-like with an edge extending upwards and outwards, a dressing spray device (5) being arranged concentrically inside the rotary table (9) and there being attached above both of these a seed dispensing and distributing channel (10, 11, 8), via which the seed streams down onto the rotary table (9) in the form of an annular veil.

23 Claims, 5 Drawing Figures

PROCESS AND AN APPARATUS FOR DRESSING SEED

FIELD OF THE INVENTION

The invention relates to a process for dressing seed which is subjected in freefall to dressing and which is subsequently thrown off outwards into a dressing chamber via a rotary table, and to an apparatus for carrying out this process, which has a dressing chamber which contains a seed dispensing and feed system and in which seed falling in freefall is subjected to a dressing delivered by a dressing distributor device and is deflected and thrown off by a rotary table arranged under the dressing distributor device.

BACKGROUND OF THE INVENTION

DE-C-531,382 describes a dressing apparatus with a dressing chamber, in which a jet of dressing is generated radially from a centrifugal disk outwards and is sprayed two-dimensionally. A continuous veil of seed falls down outside the centrifugal disk over the entire periphery, and the seed and jet of dressing meet one another along a circular line. Such an arrangement has not always proved entirely satisfactory, especially because some of the dressing settles on the walls of the apparatus and the seed grains can therefore never be enveloped to a sufficient extent.

In contrast to this, in the state of the art known from HU-A-157,922, the functions are partially reversed. Here, the product stream is thrown off in freefall onto a conical centrifugal grain plate arranged inside a dressing chamber. The free-falling stream of grains is acted upon over the entire length of its travel by two spray nozzles located opposite one another. The grain stream is deflected by means of the centrifugal grain plate and the retention time of the individual grains in the dressing space is increased, thus improving the mixing of the grains with the dressing.

However, the disadvantage of the two above-indicated solutions from the state of the art is that a considerable proportion of the dressing is sprayed onto the wall of the apparatus located opposite the dressing nozzle, and this is no longer desirable, especially where the mercury-free dressings used more and more frequently are concerned, since these dressings are sometimes extremely sticky and can form crusts on the walls of the apparatus. Furthermore, as can quickly be established by means of dressing patterns, the known apparatuses unfortunately do not ensure that the dressing is sufficiently distributed over the grain as desired, and even the distribution intensity varies greatly from grain to grain. When mercury-containing dressings were used, this was not so important because it was still possible to obtain via the evaporation stage a relatively uniform covering over all the grains, even in the bags filled for the user. This is because, as a result of the mercury vapor pressure, the substances diffuse in gas form more easily into the places on the grain, even into uneven regions and, for example, into the grain furrow, so that it was thereby possible to cover relatively effectively even hollow places with a protective layer via tiny crack orifices in the furrow region. More recently, however, new trends among users have become noticeable. One of these arises because the dressing is intended to exert a so-called aureola effect in the soil, that is to say some of the dressing on the grain sown in the soil dissolves, diffuses into the immediate vicinity and kills troublesome microbes and fungi in the soil within a certain circumference. A complete and uniform covering with dressing is not absolutely necessary for this. However, objections to the effect that this method should preferably not be used for seed have been raised more recently on ecological grounds.

In some countries, the use of mercury for dressings is prohibited because of the toxicity of mercury, so that new solutions have to be sought from both the chemical and the constructive point of view, so that at the very least the quantities of poison required can be kept as low as possible.

Starting from this, the object on which the invention is based is to develop a seed dressing process which produces an excellent dressing effect, whilst at the same time ensuring a particularly low consumption of dressing, and also to find an apparatus which is especially suitable for this.

According to the invention, in a process of the type mentioned in the introduction, this is achieved because the seed is thrown off in dispensed doses as a free-falling annular veil into a trough-shaped rotary table, and during its freefall is guided through a two-dimensional jet of dressing thrown outwards from the interior of the annular veil, and subsequently the wetted seed is subjected to a dressing again on the rotary table during throwing out, the dressing being finely distributed on and massaged into the surface of the grains because the individual seed grains roll on the rotary table continuously and simultaneously come up against one another and rub on one another.

In the process according to the invention, a particularly intensive dressing effect is obtained because the seed streaming down in the manner of a veil is coated very intensively and uniformly over the grain surface as a result of the annular jet of dressing effective in two dimensions and of the wetting surface which is relatively large due to the annular veil. The seed wetted in this way then falls down onto the trough-shaped rotary table and there is accelerated radially outwards, continually changing its position, the dressing present on the surface of each grain thereby being distributed even more uniformly over the surface. During this throwing-out operation, the seed wetted in this way is sprayed with dressing again, that is to say "for the second time", thus providing a second wetting operation which lags a certain time behind the first wetting operation in the falling annular veil. This second later wetting operation starts precisely at a moment at which not only was the first wetting operation already concluded (as regards the supply of dressing), but the dressing coated on the particular grain surface during the first wetting operation had even then already been further distributed and made uniform there as a result of the impact of the grain on the rotary table and the subsequent centrifugal effects. The second wetting operation then takes place in this situation, and for this the initial conditions for a further absorption of dressing on the grain surface are thus particularly favorable. However, because the centrifugal action is still taking place at the same time on the rotary table, the dressing supplied later is also distributed over the surface of the seed grains immediately and in a particularly effective way, and consequently the seed grains, when they leave the centrifugal plate, have in the end an especially good and uniform distribution of dressing on their surface.

It has emerged that the triple effect achieved by means of the invention, namely
(1) a first spraying of an annular grain veil,
(2) a drum-like incorporation, mixing and rubbing of the predressed grain on a trough-shaped rotary table, and
(3) a subsequent intensive dressing of the seed on the rotary table, leads to surprisingly good results. At the same time, a multiplicity of force effects can be exploited. Because of the relatively high speed at which the grain can rotate about all the possible axes and move in very many directions in space, strong twisting movements of the grain can be achieved, the result of this being that the drops of dressing sprayed on are rapidly distributed over its surface and even penetrate in a similar way to a "creeping oil" into depressions and cavities which can only be reached via fine orifices, and are thereby distributed very finely. As a result of the strong movement of the grains and the intensive impact and frictional forces between the grains and relative to the trough-shaped rotary table, the grains equalize between them the amount of dressing on them, thus resulting in a massaging process on the grain surface.

The invention permits various other preferred embodiments:

It is especially preferred if the jet of dressing delivered two-dimensionally is thrown out in the form of an atomized dressing, for example via a centrifugal plate rotating at high speed about a vertical axis and via a strong airflow for atomization. This results in particularly good alignment and controllability of the dressing with regard to the moving seed streaming down in the manner of a veil, thus also improving the self-cleaning of the apparatus.

The apparatus according to the invention starts from an apparatus of the type mentioned in the introduction and is defined in that the rotary table is made dish-like with an edge extending upwards and outwards, a dressing spray device being arranged concentrically relative to the rotary table, and there being attached above both of these a seed dispensing and distributing channel, via which the seed streams down onto the rotary table in the form of an annular veil.

It is possible by means of the apparatus according to the invention to dress the indiviual seed grains very intensively, using markedly less dressing in comparison with known apparatuses, without the germinating capacity of the seed being impaired or grain damage or grain breakage occurring.

In an advantageous embodiment of the apparatus according to the invention, the rotary table and the dressing spray device have a form similar to one another (for example, a circular form) and are preferably designed with a flat central region.

In a further especially advantageous embodiment, the rotary table recessed in the manner of a dish terminates in its edge region obliquely relative to the horizontal, preferably at an angle of at most 75°, but especially at an angle of between 30 and 75°, the inclination being selected especially between 55° and 65°, for example below 60°. In an apparatus according to the invention, it is also advantageous to attach a guide device for the seed above the dish-like rotary table, as a result of which the seed streaming down in the manner of a veil can be aligned in its stream path in such a way that it strikes a predetermined region of the rotary table, especially its region of transition from the flat central part to the edge extending upwards. A particularly preferred embodiment for this is designed so that the guide device has a seed distributor cone which is arranged coaxially relative to the geometric axis of rotation of the rotary table and via which the seed flows down. It is also highly advantageous if the guide device has, underneath the distributor cone and radially outside the latter, an especially cylindrical guide wall opposite which is located, again preferably, a radially inner wall parallel to it. Advantageously, the dressing spray device is arranged on the side of the guide device facing away from the seed feed, especially on the underside of the distributor cone, and is closed off and covered over by this. Preferably, the distributor cone is also adjustable relative to a common guide surface forming an annular gap with the cone surface, in order to adjust the size of the gap, and for this purpose it can be connected, for example, to a remotely controllable adjusting device. At the same time, the distributor cone can preferably be arranged on an advantageously hollow column which is connected to the adjusting device and which receives the feed device for the dressing.

A particularly advantageous overall effect is obtained when the dressing spray device is designed as a high-speed pneumatic motor, the rotor of which has a working speed in the range of preferably 5,000 to 20,000 revolutions per minute, and at the same time the motor exhaust air can be used for atomizing (spray formation) the jet of dressing.

In a further advantageous embodiment of the apparatus according to the invention, the dressing spray device preferably having a centrifugal plate and/or at least one nozzle is arranged in such a way that the impact region of the jet of dressing (used for the second repeated supply of dressing) on the rotary table is arranged not in its central region, but at a distance from this. At the same time, the centrifugal plate is preferably arranged at half the height over which the edge of the dish-like rotary table extends upwards, in an at least approximately horizontal plane and concentrically relative to the rotary table.

As regards the operating reliability of the apparatus as a whole, especially good results can be achieved if the centrifugal plate is driven by a pneumatic motor, the exhaust air of which can be fed to the nozzle for spraying out the dressing, to obtain an injector effect. It is advantageous, furthermore, if there is a device by means of which the speed of the rotary table can be adjusted. The dressing spray device preferably has a pump which delivers the jet of dressing from its rotor and which is preferably designed as a radial pump (especially resembling a centrifugal plate), and the rotor of this radial pump appropriately has edge blades arranged obliquely relative to the radial direction. The dressing spray device is also preferably provided with an injector channel for feeding air to at least one dressing nozzle or for atomizing the dressing, and advantageously an atomizing chamber is formed in the region where the air and dressing meet.

BREIF DESCRIPTION OF THE DRAWINGS

The principle of the invention is explained in more detail below by way of example with reference to the drawing in which:

FIG. 1 shows, in longitudinal section, an embodiment of an apparatus according to the invention;

FIG. 2 shows a portion cut out from FIG. 1 (in an enlarged representation);

DETAILED DESCRIPTION

Figure 1:
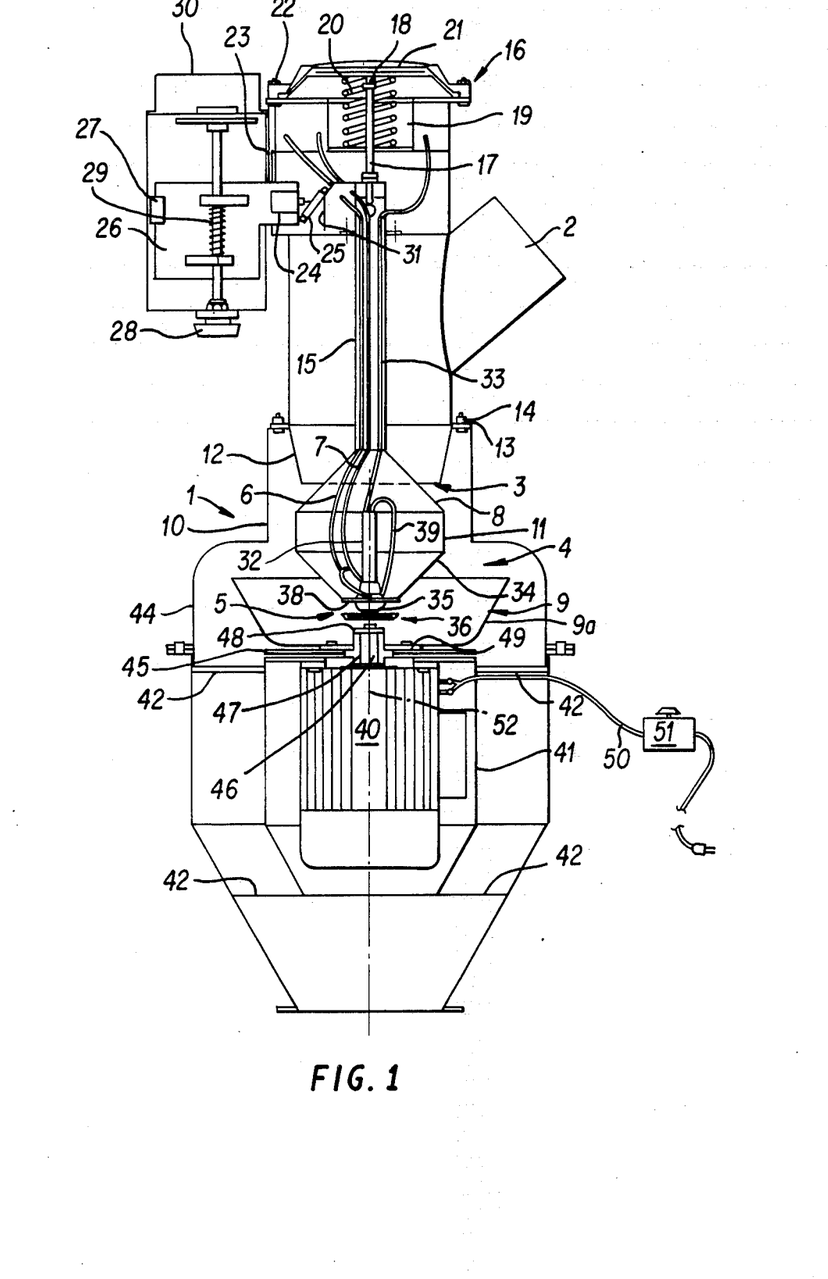

The seed dressing apparatus 1 shown in FIG. 1 has in its upper region a seed feed 2 also incorporating a dispensing gap 3, from which the seed passes into a treatment space 4. This accommodates a dressing spray device 5 which generates a jet of dressing in the form of an annular surface and which is connected to a dressing feed device in the form of two hoses 6, 7.

The seed is introduced into the dressing apparatus 1 via the feed 2 and is distributed in the region of the dispensing gap 3 via a distributor cone 8. When the seed streams down in the manner of a veil over the distributor cone 8, spreading parabolas for the path of movement of the individual seed grains are obtained at the bottom end of the distributor cone. This would mean that the individual grains would strike the rotary table 9, attached on the underside of the dressing spray device 5, within a relatively large dispersal range. To prevent this and to ensure a relatively narrow impact region, there is underneath the distributor cone 8 and radially outside the latter an outer cylindrical guide wall 10, to which a radially inner cylindrical wall 11 adjoining the distributor cone 8 is appropriately assigned, so that the seed is forced to flow within a narrowly restricted annular region and accordingly falls down in the form of an annular veil.

The dispensing gap 3 is limited on the one hand by the surface of the distributor cone 8 and on the other hand by a funnel wall 12 which is screwed firmly to the housing of the dressing apparatus 1 by means of an outer flange 13 and which, if desired, can be removed or exchanged for a funnel having a different inclination or a cylinder wall by loosening the screws 14 and lifting off the upper part of the apparatus 1. This exchangeability makes possible a rough adjustment of the dispensing gap 3.

Dispensing is carried out by adjusting the height of the distributor cone 8, as a result of which it is particularly easy to make use of remote operation, and thus ensuring easier adjustability in general. The distributor cone 8 is connected on its top side to a column 15, on the upper end of which an adjusting device 16 engages.

This adjusting device 16 is designed in the manner of a follow-up control and has a connecting rod 17 which is fastened to the top end of the column 15 and the other end of which is arranged on a diaphragm 18. Between the diaphragm 18 and a wall portion 19 integral with the apparatus extends a compression spring 20 which serves as a restoring spring (however, any other suitable restoring force, for example a pneumatic spring or the like, can also be used instead of a restoring spring). On the side of the diaphragm 18 located opposite the spring 20 there is a compressed-air space 21 which communicates via an inlet channel 22 with a compressed-air source (not shown here, but evident from the circuit diagram according to FIG. 3). However, in the delivery line 23 to the inlet channel 22, there is a shut-off valve 24 which can be actuated by means of a lever 25 and which is mounted on a carrier plate 26. This carrier plate 26 has sliding guides 27 and is vertically adjustable by means of an adjusting knob 28 and a screw spindle 29. A motor housing 30 for the motor-powered and remotely controllable rotation of the screw spindle 29 is provided on the top side of the latter.

The actuating lever 25 rests against a control cam 31 which is connected to the column 15 and serves as a position transmitter for the particular position of the column. When the carrier plate 26 is lowered by means of the knob 28 or via the remote-control device 30, the free end of the actuating lever 25 comes up against the cylindrical part of the cam 31, the lever 25 opening the valve 24. As a result, the compressed-air space 21 is put under greater pressure and the diaphragm 18 is shifted downwards until the free end of the lever 25 in turn comes up against the sloping surface of the cam 31 and shuts off the valve 24. The valve 24 is designed so that it connects the channels 22 and 23 and consequently the pressure space 21 to the outside air, as soon as the free end of the lever 25 passes beyond the sloping surface of the cam 31, on its top side. As a result, pressure is let off from the pressure space 21 until the cam 31 has resumed the relative position to the lever 25 evident from FIG. 1, under the effect of the restoring spring 20.

Figure 4:
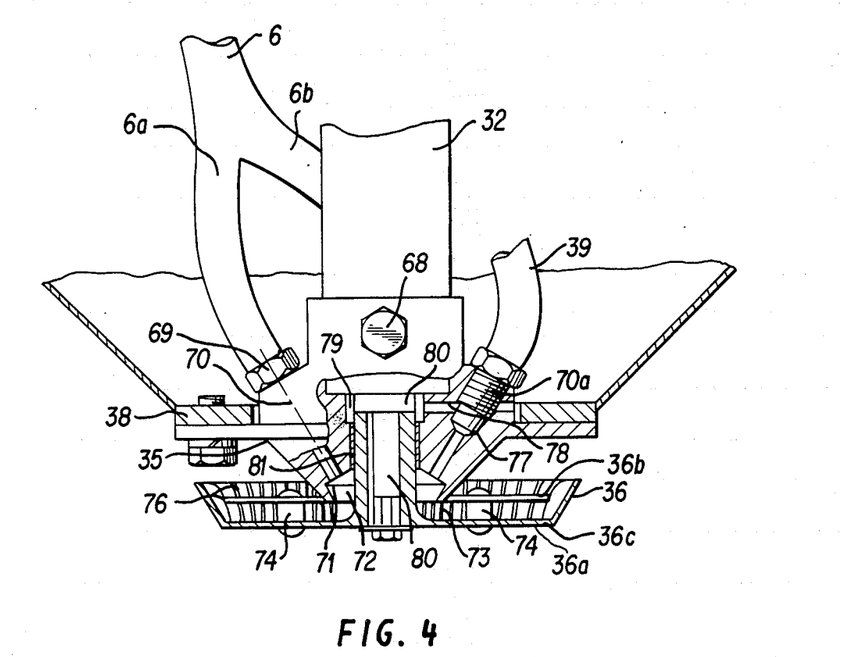
Figure 4A:
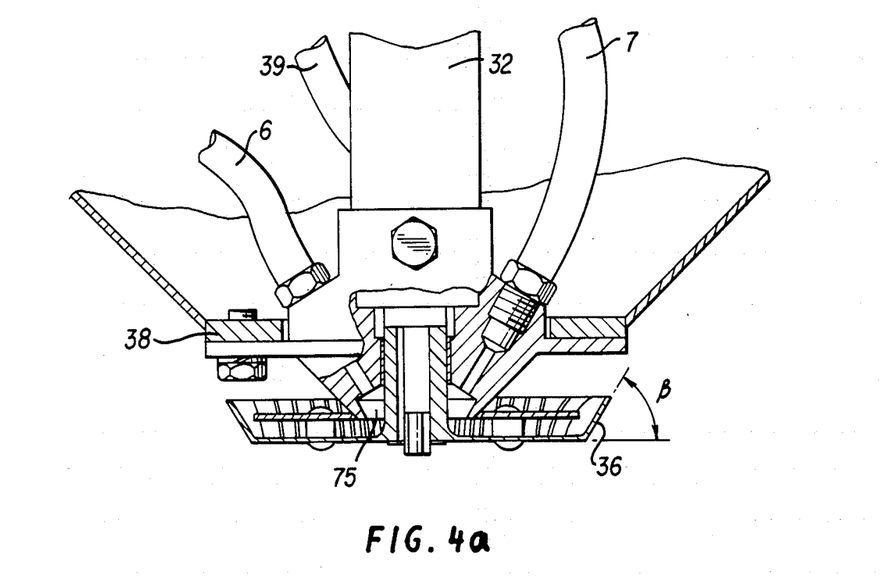

Possible designs of the dressing spray device 5 are illustrated in FIGS. 4 and 4a and are explained in more detail below. It will merely be mentioned at this juncture that the hoses 6 and 7 (FIGS. 1 and 4a) serve for supplying (if appropriate different) dressings in a solid, liquid or vapor state and open out on the top side of the dressing apparatus 1, where connections (not shown in the Figures) to an appropriate dressing supply are provided. Furthermore, a compressed-air hose 33, through which the driving compressed air is fed to the pneumatic motor 33, also extends within the distributor cone 8 and within the column 15 connected to it. The casing wall of the column 15 has on its top side appropriate, for example slot-shaped orifices, through which the hoses 6, 7 and 33 are guided. It should be pointed out that by means of this arrangement the entire dressing feed system consisting of the column 15, the distributor cone 8, the adjoining cylinder wall 11 and a masking cone 34 leading downwards is protected against the effect of dust when seed is introduced. As is evident, the masking cone 34 extends approximately at the same angle as the upward-directed edge region 9a of the rotary table 9.

The lower ends of the hoses 6 and 7 are connected to a nozzle head 35 (FIGS. 4 and 4a) which surrounds the motor shaft of the pneumatic motor 32 centrally, a centrifugal plate 36 in the form of a rotary table being fastened to the bottom end of the motor shaft. In the arrangement illustrated, the motor 32 and the nozzle head 35 are fastened inside the cone unit 8, 11 and 34. If desired, however, the parts 32 and 35 could also be fastened integrally with the apparatus on the top side of the apparatus 1, for example via a rod guided through the column 15. Within the cone unit 8, 11, 34 there is, in addition to the hose 33 for supplying air to the pneumatic motor 32, a further hose 39 which leads from the rear end of the motor 32 to the nozzle head 35. The exhaust air from the motor 32 is fed through this hose 39 to the nozzle head 35, in order to ensure there as a result of the build-up of an injector effect a better atomization of the dressing supplied via the hoses 6 and 7. As a result, liquid dressings in particular can be atomized to very fine droplets, thus ensuring very good distribution of the dressing.

Inside the treatment space 4, a motor 40 is arranged in a covering housing 41 which is open on its underside to allow the inflow of cooling air. The covering housing 41 is retained within the treatment housing 44 by means of radial webs 42. On the top side of the covering housing 41 there is an assembly plate 45, to which the motor 40 is fastened. The shaft 46 of the motor 40 projects through an orifice 47 in the assembly plate 45 and is provided with a cover cap 48 which itself projects through a central hole in the rotary table 9 of approximately the same size as itself and is connected releasably to the rotary table 9 via a flange 49. By means of this connection, it is possible, for example, to change the geometric relationships according to the type of seed by removing the rotary table 9 and replacing it with another rotary table having a different form or inclination of its edge, if appropriate even of a different height or the like. A further possibility of adapting the apparatus to different types of seed is to connect the motor 40 to a speed-adjusting device (not shown) via a cable 50 concealed, for example, underneath a web 42, so that the ratio of the speed-dependent amount of centrifugal force to the amount of centripetal force determined by the inclination of the edge of the rotary table 9 can be varied.

Figure 2:
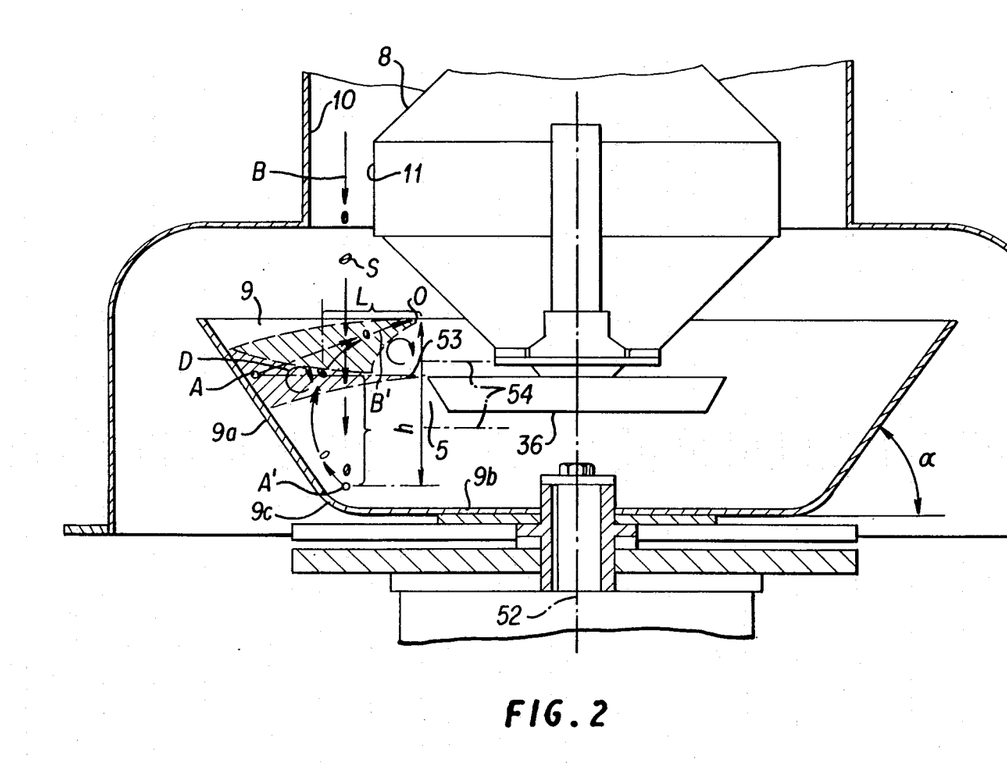

With reference to FIG. 2, the mode of operation and particular features of the geometrical arrangement and the play of forces are as follows:

The rotary table 9 rotatable about an axis 52 has a flat central region 9b which an edge region 9a inclined obliquely upwards adjoins via a curve 9c. The inclination of the edge 9a relative to the horizontal corresponds to an angle $\alpha$ which is appropriately selected less than 75°, preferably in the range between 30° and 75°, and should be selected particularly between 55° and 65°. In the preferred exemplary embodiment illustrated, this angle amounts to 60°.

The amount of centrifugal force exerted on the seed S as a result of the rotation of the rotary table 9 depends essentially on where the seed S strikes the rotary table 9. The cylinder walls 10 and 11 (see also FIG. 1) therefore constitute a limitation of the seed path indicated by a broken arrow line B in FIG. 2.

The centrifugal plate 36 sprays the usually liquid dressing along an initially horizontal surface 53 indicated by dot-and-dash lines (with an impact point A on the rotary table edge), although because of the unavoidable spreading of the jet and the force of gravity the actual path lies approximately within the region represented by hatching. Consequently, even if the seed S were to fall on the flat bottom 9b of the rotary table 9 relatively near the axis 52 (see FIG. 2), during its fall along the line 53 it would pass through the jet of dressing a first time, then strike the rotary table 9 and subsequently be moved radially outwards (to the left in FIG. 2) as a result of the radial acceleration which it undergoes there and it then penetrates once again into the hatched region of the dressing jet 53 and is guided through the dressing jet 53 there again. This ensures that the jet of dressing 53 is utilized in a particularly effective way because the seed S passes through it twice.

However, in the exemplary embodiment illustrated in the Figures, another effect is also exploited in addition, this being known as a "slice" in tennis: the path B of the seed S is appropriately aligned so that the seed S strikes the rotary table 9 at A' approximately in the curved region 9c, hence at the start of the oblique edge region 9a. This impact point A' is at a relatively long distance from the axis 52, and consequently the centrifugal force acting there is relatively high. However, the slope of the edge 9a opposes a centripetal force to this centrifugal force. The result of the play of forces occurring in conjunction with the rotation of the rotary table 9 thus causes the path B to be deflected not only in the axial direction, but also in the peripheral direction of the rotary table 9, thus producing as a whole a spiral helix (see the curved part B' of the path B in FIG. 2). In this path section B', each individual grain is forced to roll on its support as a result of the radially acting pressure, so that it experiences a spin rotation according to the arrows D. Since, at the same time, as can be seen in FIG. 2, the jet of dressing 53 is also deflected approximately in the same direction, the seed and the dressing are guided together along the path section B'. In this path section B', the individual grains roll about their own axes in the liquid dressing as a result of their spin rotation D and are thereby wetted uniformly with dressing again from all sides. An especially intensive dressing effect is achieved as a result, in comparison with a dressing treatment which is carried out from only one side and on only a single side of the seed S, and in which there is the possibility that the seed grain will be exposed to damage from pests on the untreated side. The geometrical relationships are appropriately selected so that the jet line 53 up to the impact point A approximately bisects the path B of the seed S within the rotary table 9. In particular, the seed S, after passing through the jet of dressing 53 located approximately at half the height h (over which the edge region extends upwards), runs over the length l up to the impact point A', is then deflected and runs over approximately the same distance l back to the point of intersection with the jet line 53, as a result of which the path section B' is obtained over a total radial length L (see the illustration in FIG. 2). In this way, therefore, the seed path B inside the rotary table 9 is approximately bisected by the jet line 53 when the seed passes through again, although a certain tolerance arises because the centrifugal plate 36 can move within certain limiting lines 54 indicated by broken lines in FIG. 2. At the point 0 the seed S, together with any dressing which is still present, then leaves the rotary table 9 and is thrown off. As already mentioned, the exact position of the point 0 depends on the speed of the rotary table 9, on the angle $\alpha$ and on the mass of the individual seed grains.

Figure 3:
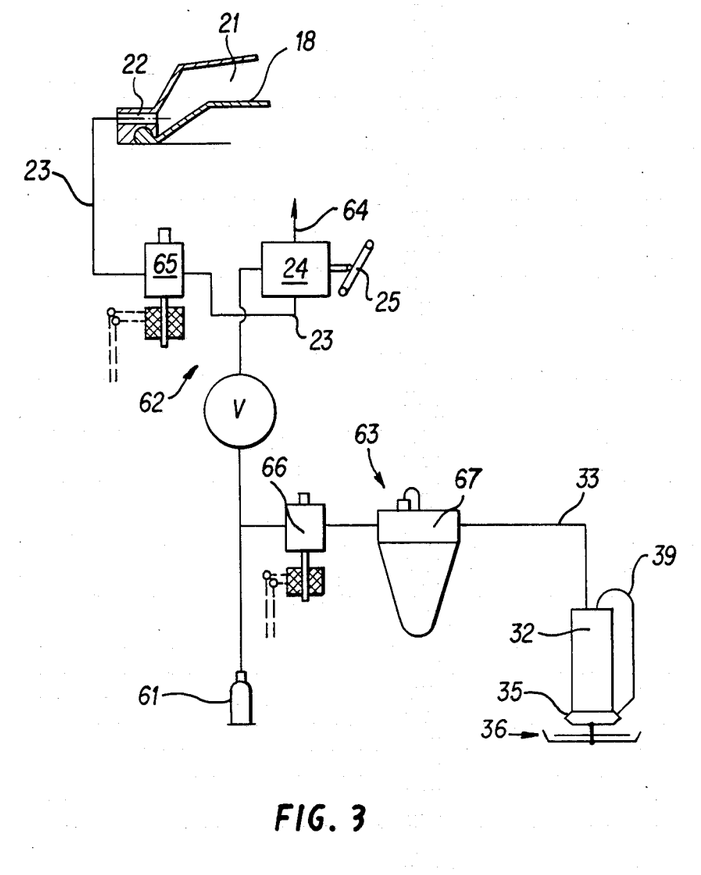
FIG. 3 shows a circuit for the apparatus according to FIG. 1, and FIGS. 4 and 4a show a design of the dressing distributor device for an apparatus according to the invention.

A control system for the apparatus, for example that according to FIG. 1, is now explained with reference to FIG. 3. Two control circuits 62 and 63 parallel to one another extend from a compressed-air source 61. Whilst the control circuit 62 controls the abovementioned height adjustment of the distributor cone 8, the pneumatic motor 32 is arranged in the control circuit 63. The line leads from the compressed-air source 61 in the control circuit 62 via a precision pressure regulator V, by means of which a predetermined constant pressure is maintained in the control circuit 62. The outlet of the precision regulator V is connected to the inlet of the valve 24 already mentioned, which on the other hand is also connected to the line 23. Furthermore, a venting line 64 is also provided on the valve 24. Depending on the position of the actuating lever 25, the line 23 is connected either to the compressed-air source 61 (via the precision regulator V) or, for letting off the pressure from the pressure space 21, to the venting line 64. Moreover, the line 23 can also be cut off at random via a solenoid valve 65.

A similar cut-off valve 66 is provided in the control circuit 63, in which the pneumatic motor 32 is supplied via the line 33. An appropriate device 67 can be inter- 
posed to feed lubricant to the motor 32. The exhaust air from the motor 32 is appropriately conveyed back to the nozzle head 35 via the line 39, in order to exert an injector effect on the dressing supplied. The details of the nozzle head 35 and of the centrifugal plate 36 located under it can be seen in FIGS. 4 and 4a.

The nozzle head 35, together with the pneumatic motor 32 fastened to it via a screw 28, is held by an assembly plate 38 (see FIGS. 1, 4, and 4a) and is fastened by means of devices (not shown in the Figures). A branch-off (branch 6a) of the dressing feed hose 6 and the hose 39 for supplying the exhaust air from the motor 32 open into the nozzle head 35, for example opposite one another in terms of the center axis 52. A further branch 6b of the hose 6 opens into the nozzle head 35 at a point offset approximately 45° relative to the first branch 6a (FIG. 4); however, as shown in FIG. 4a, the mouth of the second hose 7, for example for another dressing, can also be provided there, although the hose 7 could also open into the nozzle head 35 at a point offset 90° relative to the branch 6a of the hose 6. In either case, the mouths of the branch 6b and of the hose 7 shown in FIG. 4a are designed in the same way as illustrated with reference to the branch 6a in FIG. 4. These hoses are connected by means of dutch nuts 69 to threaded connections 70 which are each screwed into the nozzle head 35 and via which the dressing is conveyed out of the particular hose 6 or 7 into a nozzle channel having a mouth orifice 71 at its bottom end. The mouth orifice 71 is adjacent to an annular chamber 72 which is closed off radially towards the outside by an annular projection 73. The dressing is sprayed via the annular chamber 72 onto the surface of the flat central portion 36a of the centrifugal plate 36. To prevent a rebound (as a result of which droplets could unintentionally settle on the outside of the nozzle head 35 and on the underside of the assembly plate 38), there is above the central portion 36a a corotating cover plate 36b which is held at a distance by means of bolts 74 and which has a central orifice 75, through which extends the annular projection 73 of the nozzle head 35. As a result of the centrifugal effect of the centrifugal plate 36 rotating at high speed, the dressing located between the two plate panels 36a and 36b is guided radially outwards and thrown off via curved guide blades 76 on the edge 36c of the centrifugal plate 36. So that the individual drops of dressing are separated particularly easily, the edge 36c carrying the blades 76 extends radially outwards, so that the angle β between an outer generating line of the edge 36c and the plane fixed by the flat central portion 36a is an acute angle which is appropriately between 30° and 60°, for example 45°.

The dressing can be supplied via the hose 6 in atomized form even at this stage. To generate a high speed of several thousand revolutions per minute, for example in the range of 5,000 to 20,000 rev/min., a fluid motor is appropriately used, advantageously being designed as a pneumatic motor 32, the exhaust air of which can be utilized to achieve an injector effect on the dressing fed through the hoses 6 and 7. For this purpose, the exhaust-air hose 39 is connected to a bore 77 in the nozzle head 35 via a threaded connection 70a (see FIG. 4) which has essentially the same design as the connection 70. However, the bore 77 communicates with a transverse channel 78 which is bored from the outer periphery of the nozzle head 35, but which is covered towards the outer periphery by the threaded connection 70a, the bore 77 intersecting the channel 78 at an angle.

The channel 78 opens at its inner end into an annular chamber 79 which surrounds the shaft 80 of the pneumatic motor 32 in the region of the mouth of the channel 78. On the side located diametrically opposite the mouth of the channel 78, the annular chamber 79 communicates with an axial channel 81 which extends parallel to the shaft 80 and opens into the annular chamber 72 in front of the mouth 71 of the dressing feed channel and which thus initiates an injector effect exerted by the air flowing out from it on the dressing arriving through the mouth 71.

However, the cover plate 36b (FIG. 4) also has an additional function in that it forms, together with the central portion 36a, a radial channel to the guide blades 76 which leads away from the chamber 72. Consequently, the suction exerted as a result of the high speed of the guide blades 76 takes effect via this channel up into the chamber 72 or up to the mouth orifice 71, and this means that in the construction according to FIGS. 4 or 4a, the centrifugal plate 36 is designed practically as a rotor of a radial pump. This principle is per se entirely independent of how well the dressing jet thereby generated is utilized as a result of the passage of the seed through it several times or once only. On the other hand, it goes without saying that, if desired, the jet of dressing could also be delivered via the rotor of an axial pump. However, because the centrifugal plate 36 is designed as a radial-pump motor, a fortunate combination of a radial jet in the form of an annular surface and the suction effect described is obtained. At the same time, the channel leading to the guide blades 76 could be formed not by a corotating plate 36b, but by a fixed plate which can have the same design as the plate 36b, out which is not fastened to the central portion 36a, but to the assembly plate 8.

Even if a pneumatic motor were not used, it would be advantageous to provide an injector arrangement in the way described, the chamber 72 greatly assisting the atomization of the dressing, and this can be effected irrespective of whether a centrifugal plate 36 designed as a radial-pump motor with guide blades 76 is provided or not (although if it is present there is the advantage of a particularly uniform suction effect).

It has proved particularly advantageous if the rotary table 9 does not have any perforations, that is to say, for example, not even in the sieve plate. All parts of the seed and all the dressing must leave the rotary table 9 via the rotary table edge as a result of centrifugal force.

I claim:

1. A process for dressing seed which is subjected to dressing while in freefall towards a rotary table and which is subsequently ejected outwardly into a dressing chamber from the rotary table, comprising the steps of:

(a) introducing the seed continuously, in the form of a free-falling veil, onto a trough-shaped rotary table, said table having an upper edge and a bottom surface, (b) during the freefall, conveying the seed through a two-dimensional jet of dressing thrown outwardly from the interior of the annular veil at a height intermediate said upper edge and bottom surface, (c) prior to said outward ejection, finely distributing the dressing and massaging it into the surface of the grains as a result of the individual seed grains being rolled on the rotary table continuously and at the same time striking against one another and rubbing on one another, and (d) subsequently subjecting the wetted seed to dressing again on the rotary table during outward ejection.

2. A process as claimed in claim 1, wherein the two-dimensional jet of dressing is thrown out in the form of an atomized dressing.

3. In an apparatus for dressing seed, the apparatus being of the type including a dressing chamber having a seed dispensing and feed system, in which seed falling in free-fall is subjected to dressing delivered by a dressing distributor device and is deflected and thrown off by a rotary table arranged under the dressing distributor device, the improvement comprising:

said rotary table being made dish-like and having an edge member extending upwards and outwards to a top edge thereof and a bottom surface, a dressing spray device arranged concentrically inside the rotary table at a height intermediate said top edge and said bottom surface thereof and a seed dispensing and distributing channel mounted above said rotary table and said dressing spray device, via which the seed streams down into the rotary table in the form of an annular veil.

4. An apparatus as claimed in claim 3, wherein the rotary table and the dressing spray device have a similar form including a flat central region.

5. An apparatus as claimed in claim 3, wherein the rotary table is recessed in the manner of a dish and is obliquely inclined in its edge region relative to the horizontal at an angle of at most 75°.

6. An apparatus as claimed in claim 5, further comprising a guide device for the seed provided above the dish-like rotary table for aligning the stream path of the seed onto a predetermined region of the rotary table.

7. An apparatus as claimed in claim 6, wherein the guide device has a distributor cone for the seed which is arranged coaxially relative to the geometrical axis of rotation of the rotary table.

8. An apparatus as claimed in claim 7, wherein the guide device has a cylindrical guide wall underneath the distributor cone and radially outside the latter, and a radially inner wall located in opposed relationship to said cylindrical guide wall.

9. An apparatus as claimed in claim 6, wherein the dressing spray device is arranged on the underside of the distributor cone and is covered by the latter.

10. An apparatus as claimed in claim 7, further comprising a guide surface forming an annular gap with the cone surface, and remotely controllable adjusting means connected to the distributor cone for permitting adjustment thereof relative to said guide surface.

11. An apparatus as claimed in claim 10, wherein the distributor cone is formed on a preferably hollow column which is connected to the adjusting device and which receives the feed device for the dressing.

12. An apparatus as claimed in claim 3, wherein the dressing spray device has at least one nozzle for the dressing and is constructed and arranged so that the impact region of the dressing jet on the rotary table is located a distance from the central region of the latter.

13. An apparatus as claimed in claim 3, further comprising a centrifugal plate arranged at half the height over which the edge of the dish-like rotary table extends upwards, in an at least approximately horizontal plane and concentric relative to the rotary table.

14. An apparatus as claimed in claim 3, wherein the centrifugal plate is driven by a pneumatic motor producing exhaust air which is be fed to a nozzle for the dressing to achieve an injector effect.

15. An apparatus as claimed in claim 3, further comprising an adjusting device for the speed of the rotary table.

16. An apparatus as claimed in claim 3, wherein the dressing spray device is designed as a high-speed pneumatic motor with a working speed of approximately 5,000 to 20,000 rev/min., and the exhaust air from the motor is used to generate a spray effect.

17. In an apparatus for dressing seed, the apparatus being of the type including a treatment space which has a seed feed system and which accommodates a distributor device generating a jet of dressing and connected to a feed device for the dressing, through which jet of dressing the seed can be conveyed along a path by means of a seed distributor so as to stream in the manner of a veil, the improvement comprising a dressing spray device having a rotor including a substantially flat centrifugal plate and an edge member about the periphery of said plate sloping upwardly and radially outwardly relative to said plate, said edge member having a sloping surface facing radially inwardly and a top edge, and a plurality of inwardly projecting blades on sloping surface in spaced relationship therealong.

18. An apparatus in accordance with claim 17, wherein the dressing spray device has injector channel means for atomizing one or more dressings, and a diffusing chamber provided in the region where the air and dressing meet.

19. An apparatus in accordance with claim 17, wherein the dressing spray device has an injector channel for feeding air to at least one dressing nozzle and a diffusing chamber in the region where the air and dressing meet.

20. An apparatus in accordance with claim 5 wherein the angle of inclination is between 30° and 75°.

21. An apparatus in accordance with claim 20 wherein the angle of inclination is between 55° and 65°.

22. An apparatus in accordance with claim 6 wherein said predetermined region is located radially outside the central region, of the dish-like rotary table.

23. Apparatus in accordance with claim 17 further comprising a second place mounted in spaced, opposed relationship to said centrifugal plate intermediate said top edge and said centrifugal plate, and means for introducing said dressing between said plates.

* * * * *